(12) United States Patent
Mroz (10) Patent No.: US 9,067,632 B2
(45) Date of Patent: Jun. 30, 2015

(54) VEHICLE WITH RHOMBOID WHEEL ARRANGEMENT AND REAR WHEEL AND SIDE WHEEL STEERING

(71) Applicant: Albert Edward Mroz, Menlo Park, CA (US)

(72) Inventor: Albert Edward Mroz, Menlo Park, CA (US)

( * ) Notice: Subject to any disclaimer, the term of this patent is extended or adjusted under 35 U.S.C. 154(b) by 41 days.

(21) Appl. No.: 13/815,238

(22) Filed: Feb. 13, 2013

(65) Prior Publication Data

US 2014/0224556 A1    Aug. 14, 2014

(51) Int. Cl.
| | | |
|---|---|---|
| *B62K 3/06* | (2006.01) | |
| *B62K 5/01* | (2013.01) | |
| *B62M 1/16* | (2006.01) | |
| *B62M 6/65* | (2010.01) | |
| *B62K 3/02* | (2006.01) | |
| *B62K 3/00* | (2006.01) | |

(52) U.S. Cl.
CPC ............... *B62K 5/01* (2013.01); *Y10S 903/951* (2013.01); *B62K 3/02* (2013.01); *B62K 3/005* (2013.01); *B62M 1/16* (2013.01); *B62M 6/65* (2013.01)

(58) Field of Classification Search
CPC ............. B62K 3/005; B62K 3/02; B62K 5/08
USPC ...................................................... 280/288.1
See application file for complete search history.

(56) References Cited

U.S. PATENT DOCUMENTS

| | | | | |
|---|---|---|---|---|
| 561,330 | A * | 6/1896 | Ljungstrom | 280/269 |
| 4,410,198 | A * | 10/1983 | Fernandez et al. | 280/282 |
| 4,548,421 | A * | 10/1985 | Wiener | 280/282 |
| 4,789,173 | A * | 12/1988 | Lofgren et al. | 280/288.1 |
| 5,069,469 | A * | 12/1991 | Rosengrant et al. | 280/288.1 |
| 5,145,196 | A * | 9/1992 | Langkamp | 280/278 |
| 5,263,732 | A * | 11/1993 | Harmeyer | 280/288.1 |
| 6,402,174 | B1 * | 6/2002 | Maurer | 280/267 |
| 6,588,785 | B2 * | 7/2003 | Monary | 280/238 |
| 7,040,771 | B2 * | 5/2006 | McGuinness | 359/842 |
| 7,410,278 | B2 * | 8/2008 | Kitamura | 362/473 |
| 7,775,942 | B2 * | 8/2010 | Hildebrandt et al. | 482/62 |
| 7,976,046 | B2 * | 7/2011 | Rathsack | 280/282 |
| 8,292,315 | B1 * | 10/2012 | Pelkonen | 280/266 |
| 8,672,075 | B1 * | 3/2014 | Walker | 180/206.1 |
| 2007/0018416 | A1 * | 1/2007 | Escarguel | 280/62 |
| 2011/0006500 | A1 * | 1/2011 | Rush | 280/267 |
| 2011/0248467 | A1 * | 10/2011 | Ball et al. | 280/259 |
| 2014/0091551 | A1 * | 4/2014 | Walter | 280/267 |

* cited by examiner

*Primary Examiner* — Kevin Hurley
*Assistant Examiner* — Marlon Arce
(74) *Attorney, Agent, or Firm* — MU Patents; Timothy Mare Shropshire (57) ABSTRACT

Wheeled vehicle, comprising of one front wheel, two side wheels and one rear wheel, configured on a chassis frame in a symmetrical rhombus (diamond) layout. The non-steered front wheel is turned by pedals using human power, similar or exactly in bicycle use design, or with electric motor power. The two parallel side wheels in one axis are perpendicular to the chassis frame, allowing them to swivel in unison for steering the vehicle without elaborate axle pivoting apparatus. The rear wheel is powered by an electric motor, hybrid motor or liquid fuel motor. The rear wheel is attached longitudinally with the center of the chassis frame so that it swivels also in unison for steering with the side wheels.

13 Claims, 15 Drawing Sheets

VEHICLE WITH RHOMBOID WHEEL ARRANGEMENT AND REAR WHEEL AND SIDE WHEEL STEERING

TECHNICAL FIELD

180

BACKGROUND ART

References Cited

U.S. Patent Documents

| | | | |
|---|---|---|---|
| 138,018 | April 1873 | Gregg | 280/11.19 |
| 1,546,165 | July 1925 | Morgan | 180/21 |
| 1,796,339 | March 1931 | Nicholson | 180/209 |
| 1,835,077 | December 1931 | Nicholson | 180/226 |
| 2,111,983 | March 1938 | Massey | 280/87 |
| 2,533,752 | December 1950 | Alamagny | 180/21 |
| 2,641,480 | June 1953 | Bancroft | 280/87 |
| 3,520,378 | July 1970 | Slay | B62d 61/00 |
| 3,656,572 | April 1972 | Mercier | 180/21 |
| 3,700,059 | October 1972 | Sutton | 180/30 |
| 3,828,876 | August 1974 | Morelli | 180/21 |
| 4,041,678 | August 1977 | Chaney | 56/10.7 |
| 4,087,107 | May 1978 | Winchell | 280/220 |
| 4,133,402 | January 1979 | Soo Hoo | 180/333 |
| 4,313,511 | February 1982 | Soo Hoo | 180/21 |
| 4,432,561 | February 1984 | Feikema | 280/281 |
| 4,488,617 | December 1984 | Jaulmes | 180/209 |
| 4,497,502 | February 1985 | Forbes | 280/281 |
| 4,705,284 | November 1987 | Stout | 280/242 |
| 4,792,007 | July 1988 | Masaru | 180/414 |
| 4,775,021 | October 1988 | Marino | 180/21 |
| 4,778,023 | October 1988 | Sugasawa | 180/140 |
| 6,050,367 | April 2000 | Tvetene | 187/234 |
| 6,752,230 B1 | June 2004 | Huang | 80/209 |
| 6,942,053 B2 | September 2005 | Hinton | 180/209 |
| 7,147,235 B2 | December 2006 | West | 280/87.042 |
| 2007/0151777 A1 | July 2007 | Peng | 180/21 |
| 7,243,746 | July 2007 | Vasant | 180/6.5 |
| 7,552,934 B2 | June 2009 | Chen | 280/266 |

SUMMARY OF INVENTION

The presented invention relates to a vehicle with wheel arrangement and propulsion methods. The vehicle consists of four wheels which are in a rhombus configuration with non-steered front wheel, the latter of which may include pedals for human power.

In contrast, a three-wheel vehicle in a triangular configuration with pedals on the front wheel and steering of the two side wheels does not allow for additional propelled powering, without extreme and impractical complexity, due to physical interference of pedals at the front wheel and complexity of steering mechanisms of the side wheels. Other rhombus wheeled vehicles do not have a non-steered front wheel and involve steering of immense complexity.

The presented light vehicle is comprised of four wheels in a rhombus configuration, steered with two side wheels and one rear wheel. The front non-steered wheel is powered by two pedals as with three-wheel vehicles. The remaining three wheels are in the configuration of an isosceles triangle and are together steered in unison with the rear wheel powered by an electric or hybrid gasoline/electric system. The front pedals can be deleted so that an electric motor can be installed for additional propulsion.

The two parallel side wheels are not powered but instead swivel so as to steer vehicle along with the rear drive wheel, which also swivels in the same direction as the side wheels, the two steering mechanisms connected by linkage and/or cables.

The symmetrical rhombus (diamond) configuration of the four wheel design, in addition to steering configuration by way of the three rear wheels, comprising of the rear drive wheel and two parallel side wheels (along with additional claims) define the essential difference between this vehicle and all other vehicles which have been known to be patented up to the present time.

The vehicle may also be further enhanced with windshield, lights, luggage or light cargo container, fenders and other utilitarian and practical assemblies such as warning horn; speed, range and motor instruments; global positioning system and other commonly applied sub-assembly units for practical vehicle control.

Advantageous Effects of Invention

1. Superior steering control
2. Additional weight capacity
3. Better weight distribution
4. Low center of gravity
5. Basis for electric or hybrid drive mechanism in addition to primary pedal power
6. Additional braking system
7. Additional and larger cargo area and capacity
8. Improved road handling
9. Improved vehicle aesthetic design.

DESCRIPTION OF EMBODIMENTS

Figure 1:
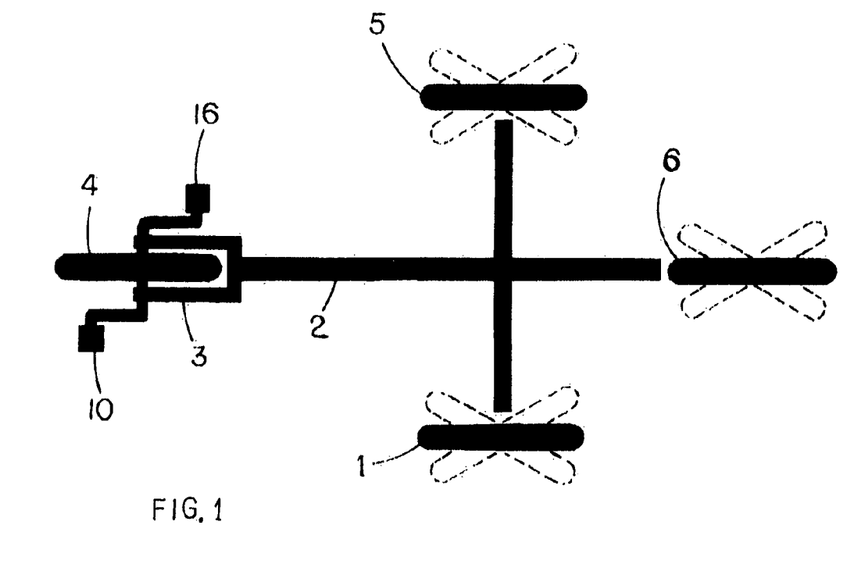
FIG. 1: Layout of basic concept of patent, showing non-steered, pedaled front wheel, chassis frame layout, two side wheels that are not powered, and rear steered wheel which is powered.
Figure 2:
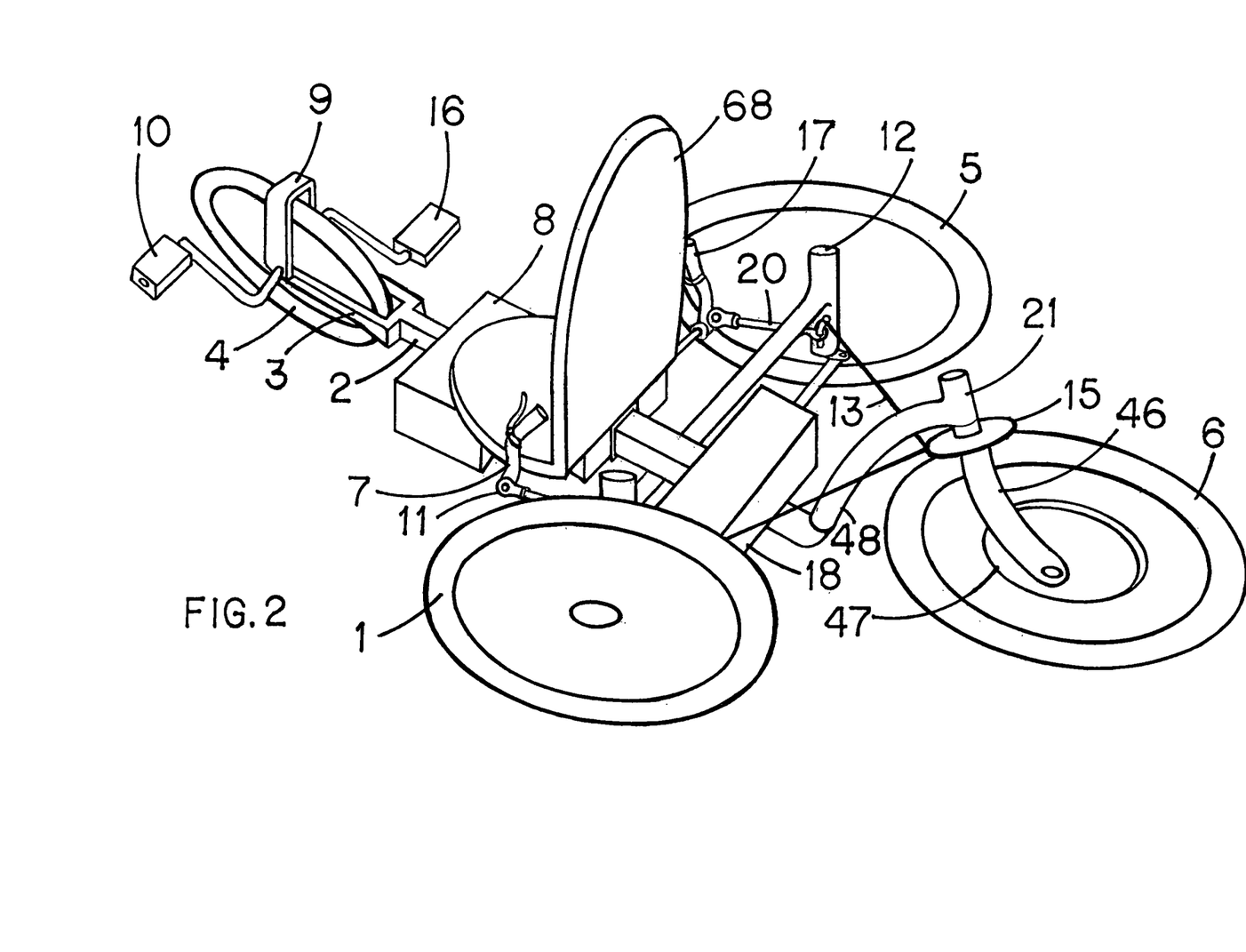
FIG. 2: Side view from above showing essential components with wheels turned for right hand turn.
Figure 3:
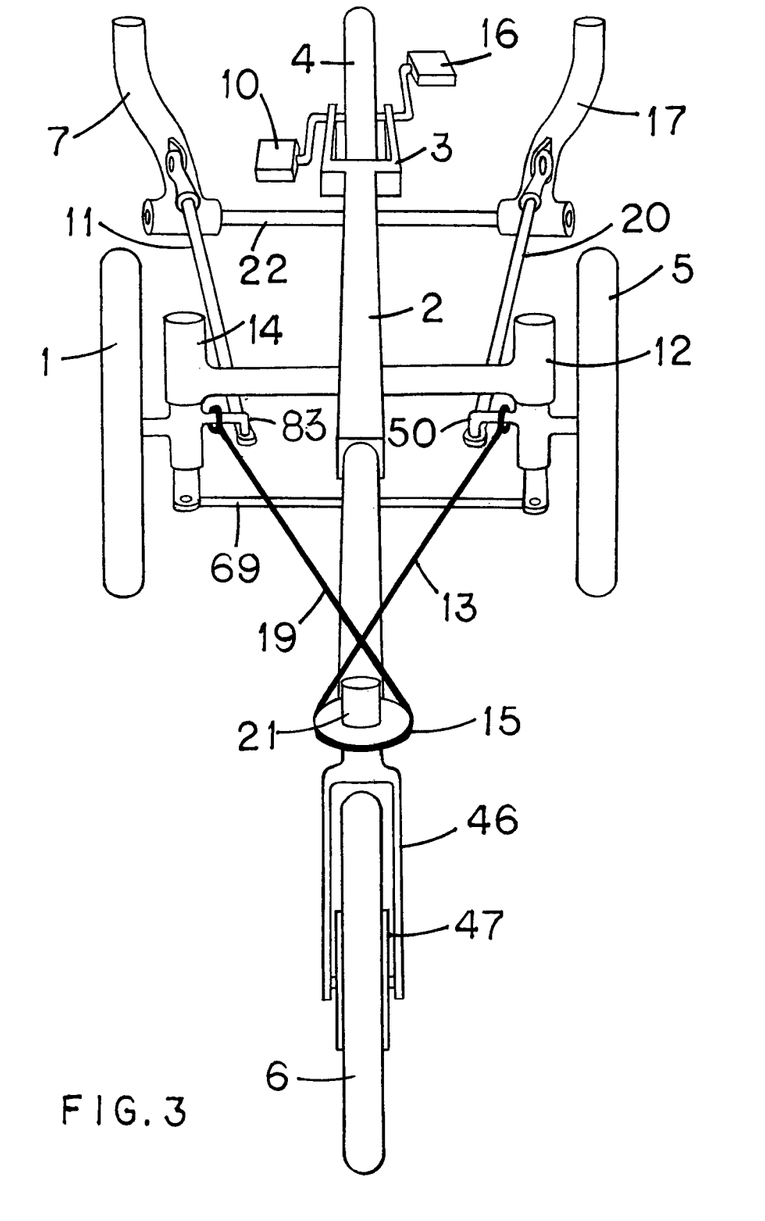
FIG. 3: View from rear at 30 degree angle above vehicle showing chassis frame components including steering mechanism.
Figure 4:
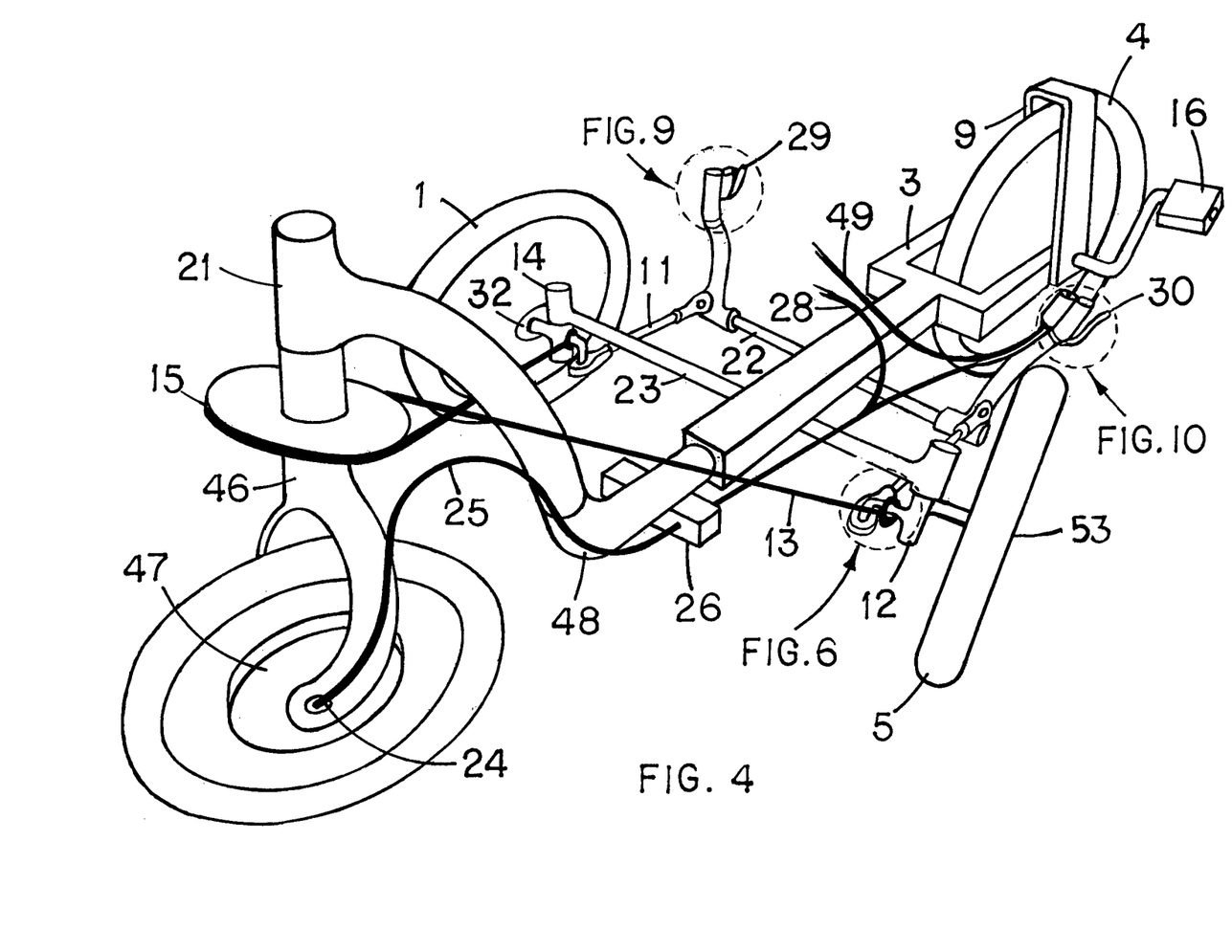
FIG. 4: Wide angle view from above right position showing chassis frame components including cable wiring and steering mechanism.
Figure 5:
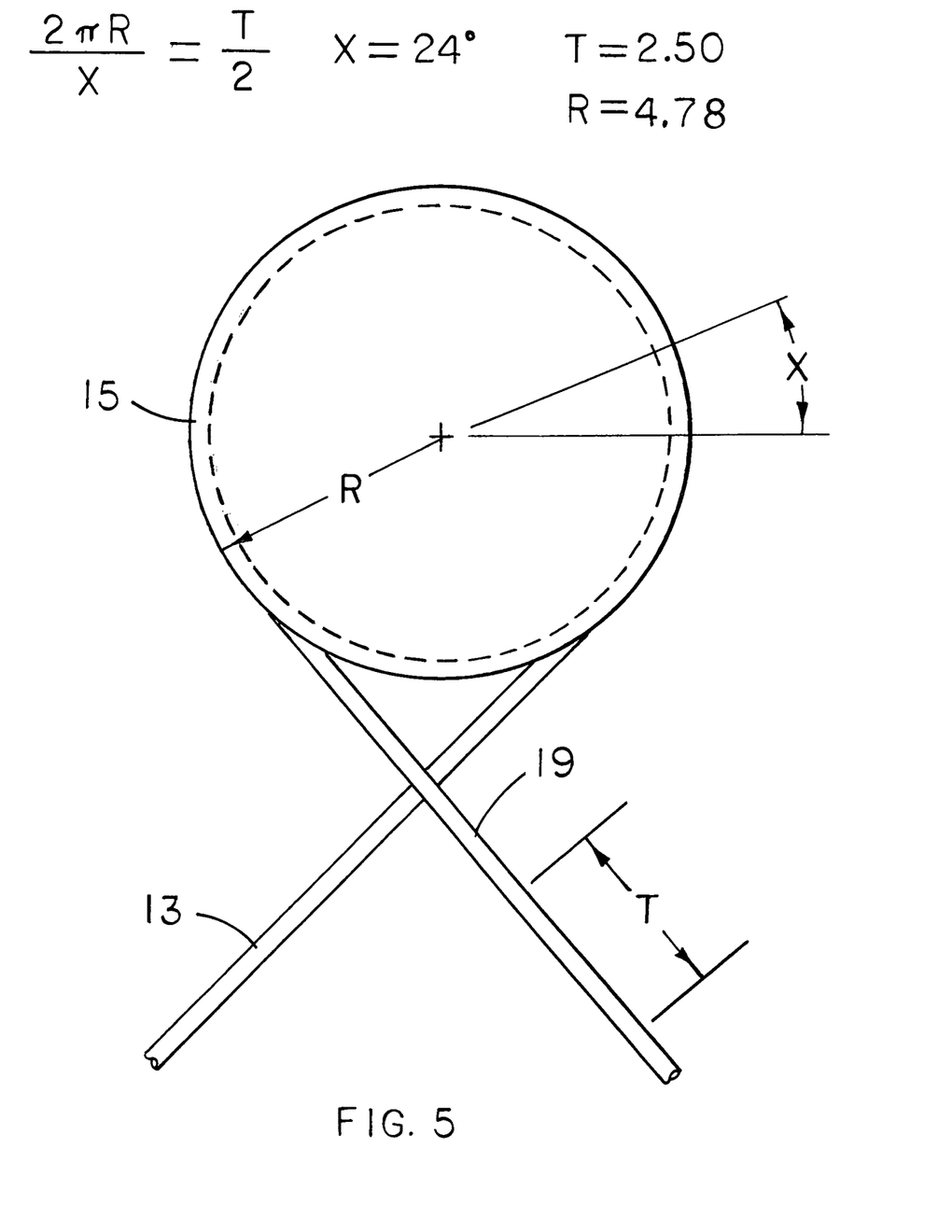
FIG. 5: Steering mechanism disc/sprocket with formula and calculation for specific turning radius of vehicle. For turning radius of 15 degrees, as per prototype, the length of steering linkage travel in one direction is 1.25 inches. By dividing the circumference of 360 degrees by 15, in order to obtain 1.25 inches the sprocket or pulley must be 9.25 inches, which is rounded off to the nearest 0.015 inches.
Figure 6:
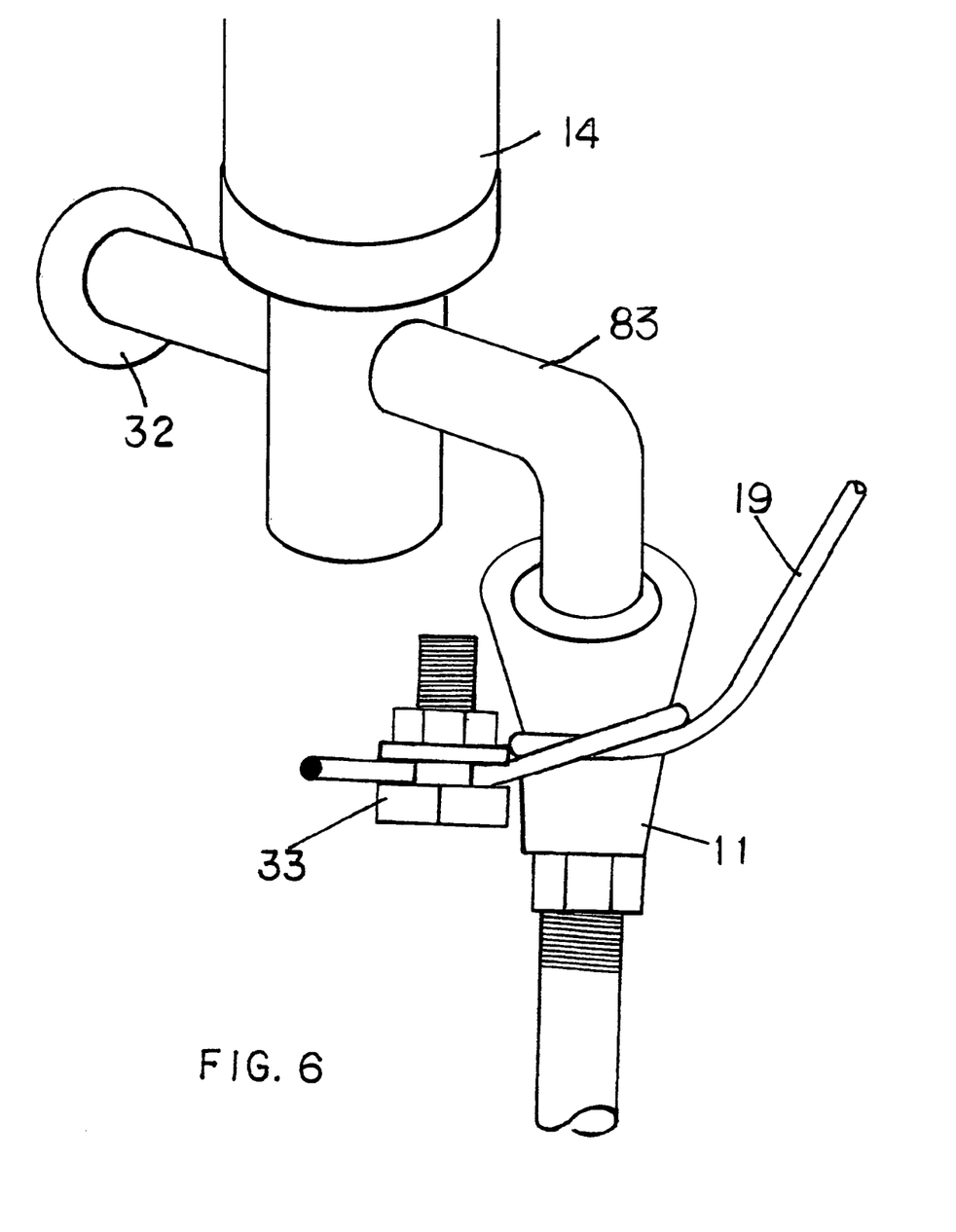
FIG. 6: Detail of steering mechanism cable anchor, first alternative.
Figure 7:
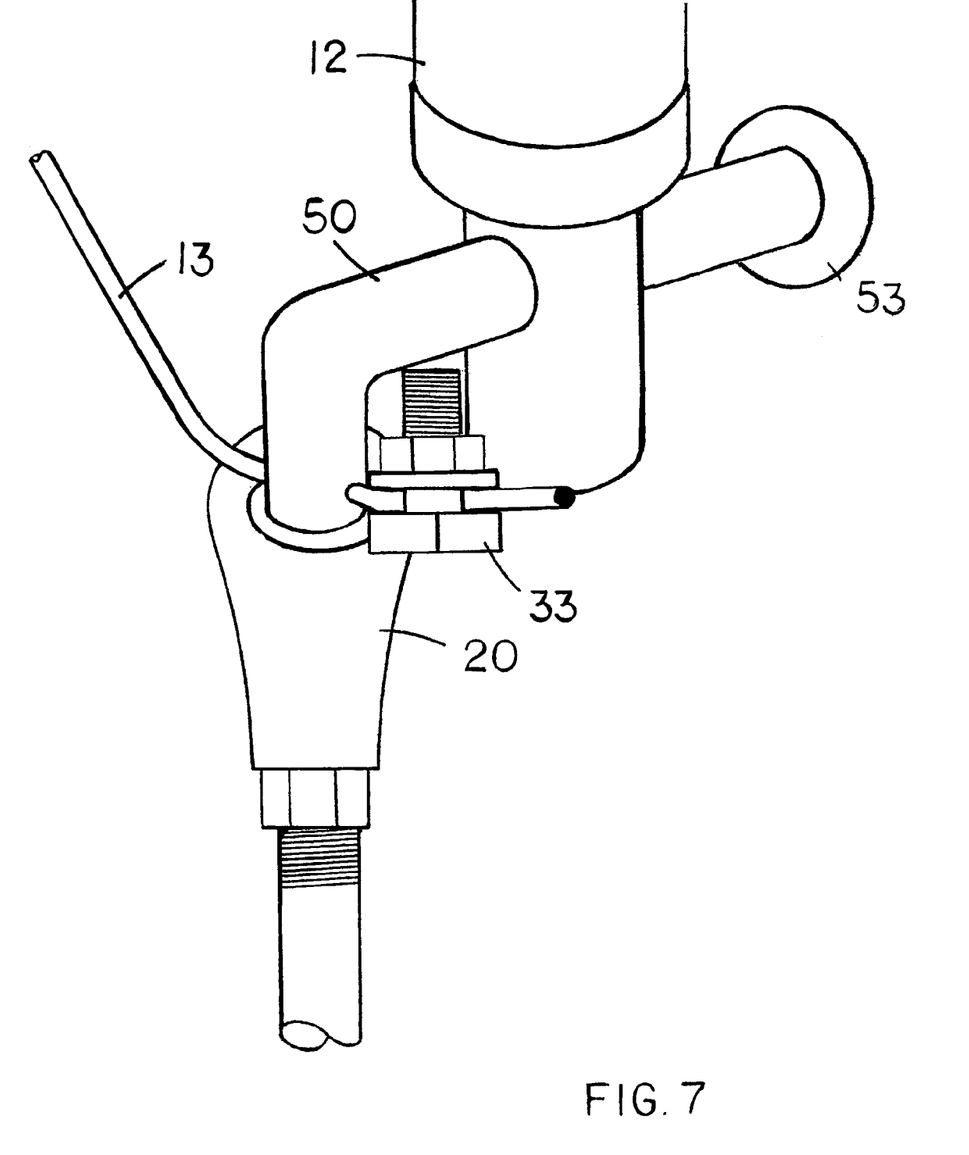
FIG. 7: Detail of steering mechanism cable anchor, second alternative.
Figure 8:
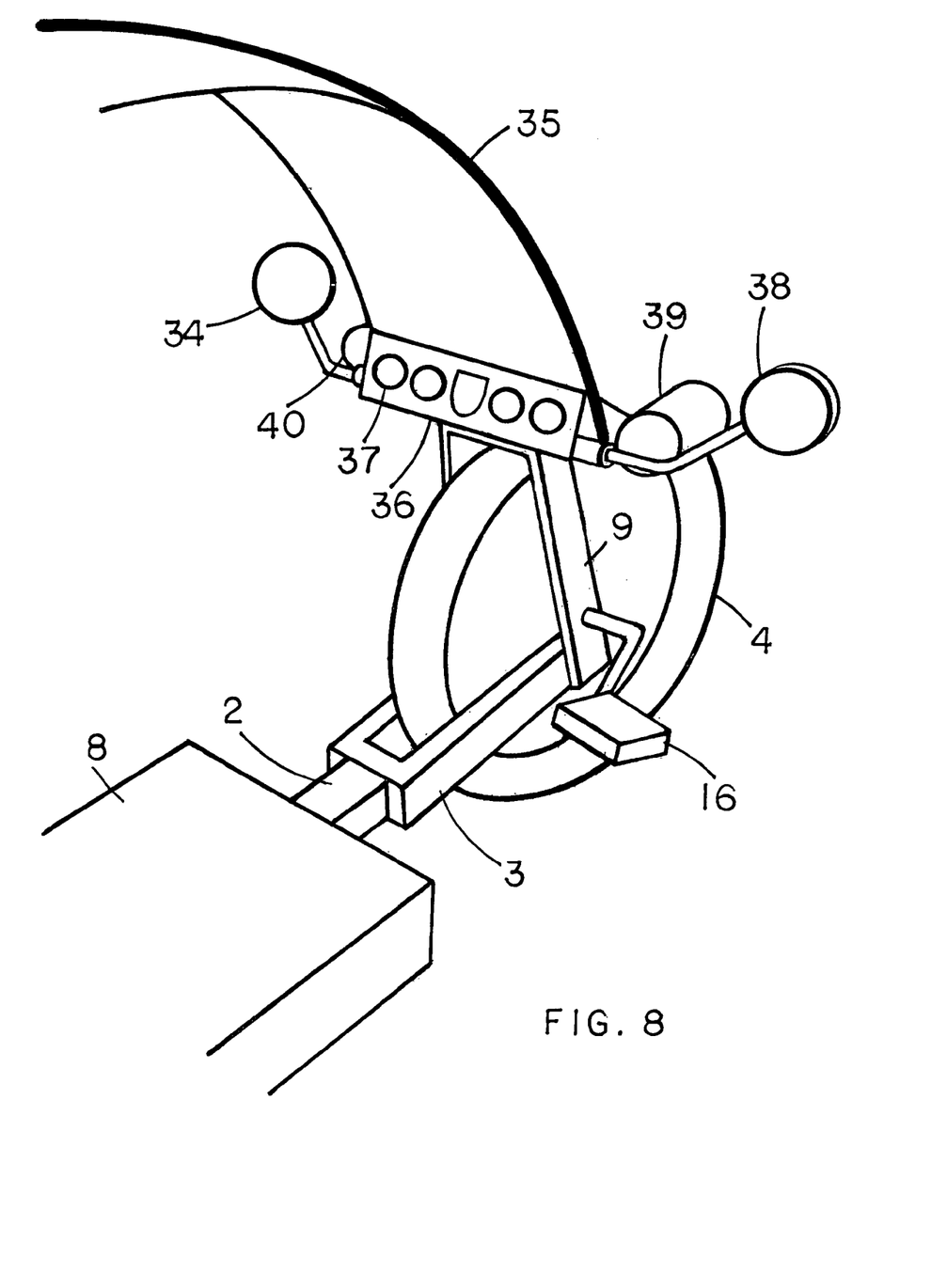
FIG. 8: Side view from rear showing windshield, dashboard and front wheel assembly as attached to chassis frame.
Figure 9:
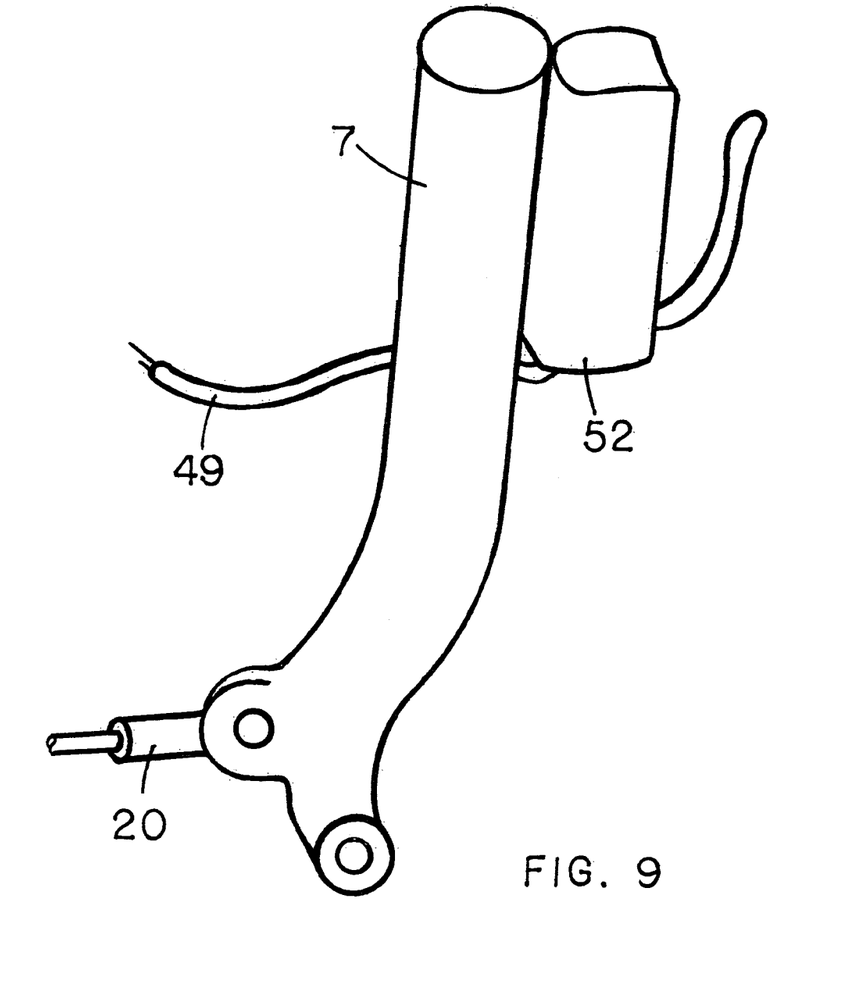
FIG. 9: Detail showing left steering arm lever with electric motor power variable speed potentiometer and pivot attachment of steering linkage.
Figure 10:
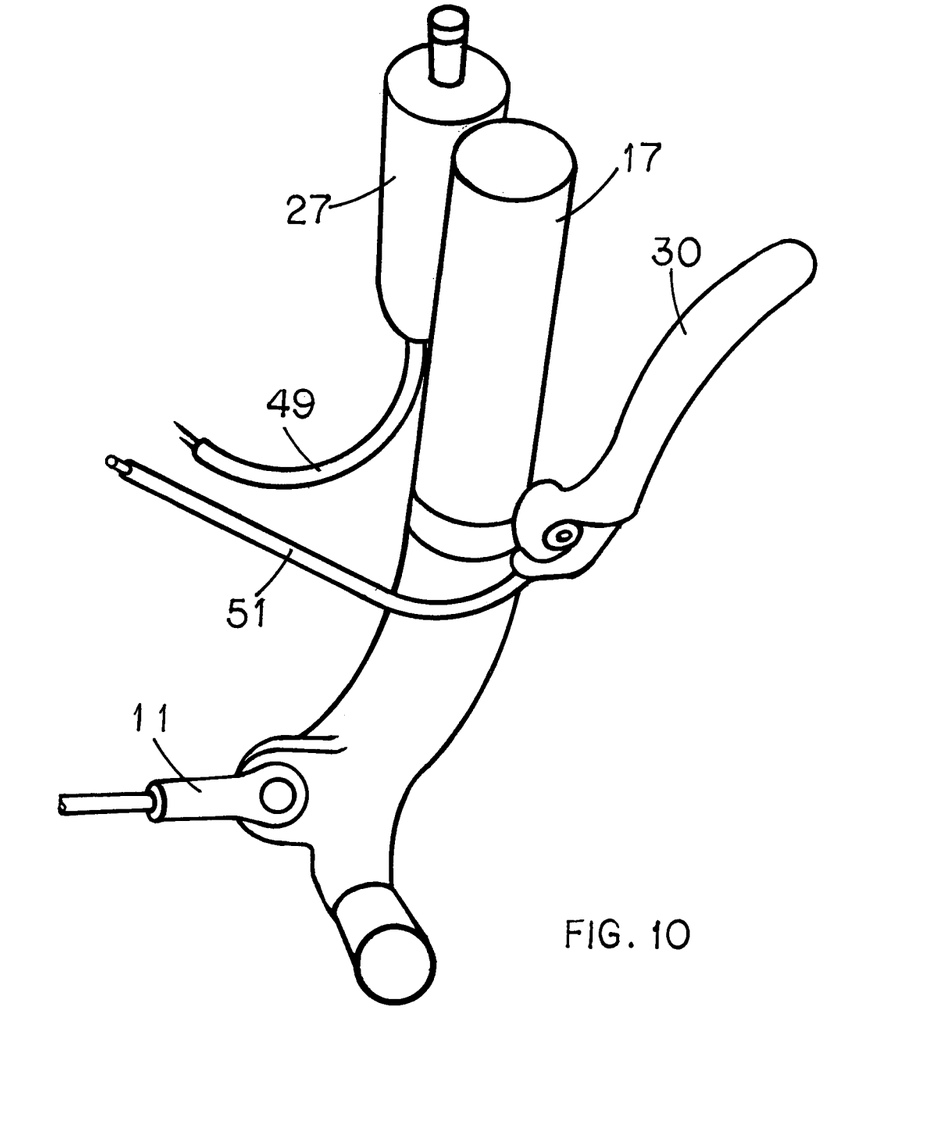
FIG. 10: Detail showing right steering arm lever with electric motor power switch and brake handle with cables and pivot attachment of steering linkage.
Figure 11:
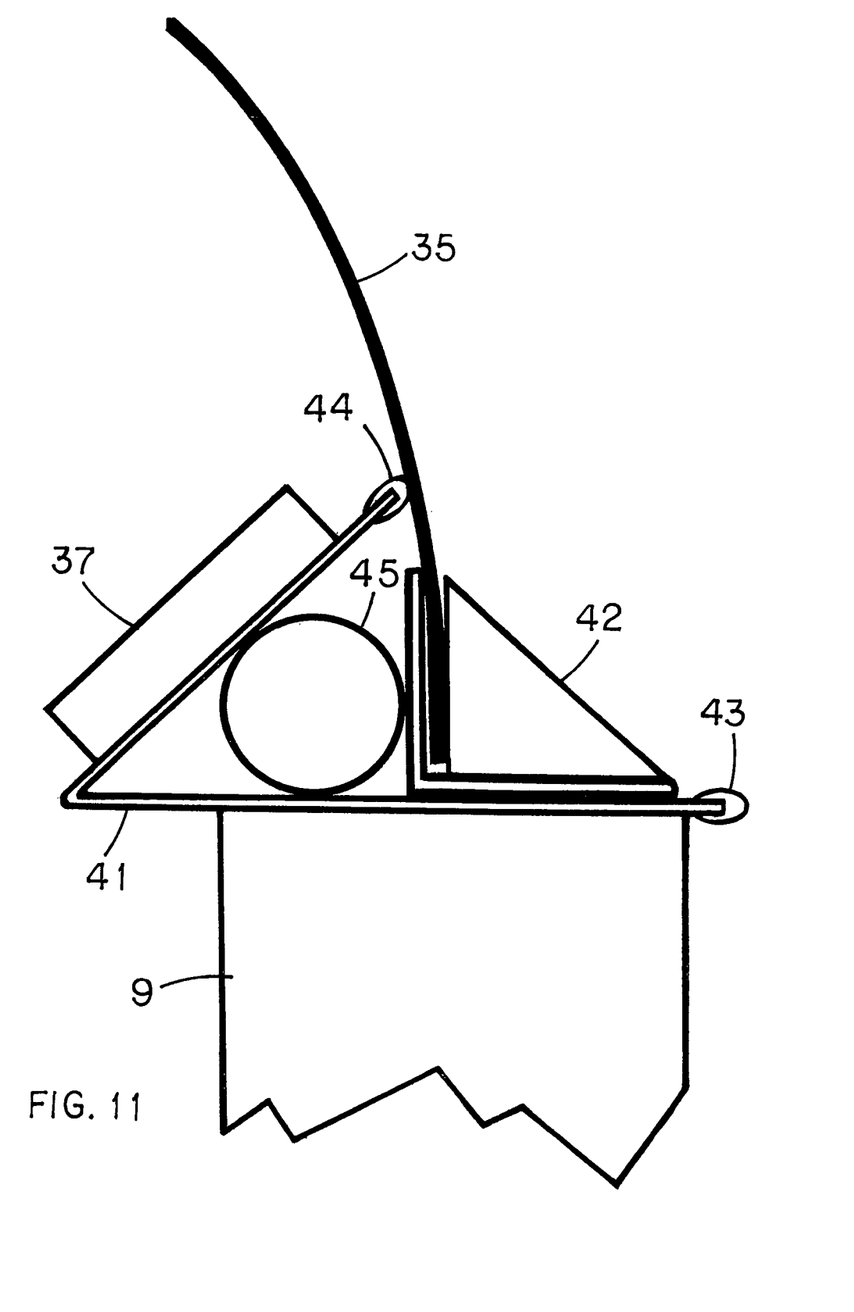
FIG. 11: Detail showing windshield and dashboard assembly as a proprietary safety feature wherein the lower windshield edge is clamped so as to deploy up and out of the vehicle in the event of being struck from inside by driver.
Figure 12:
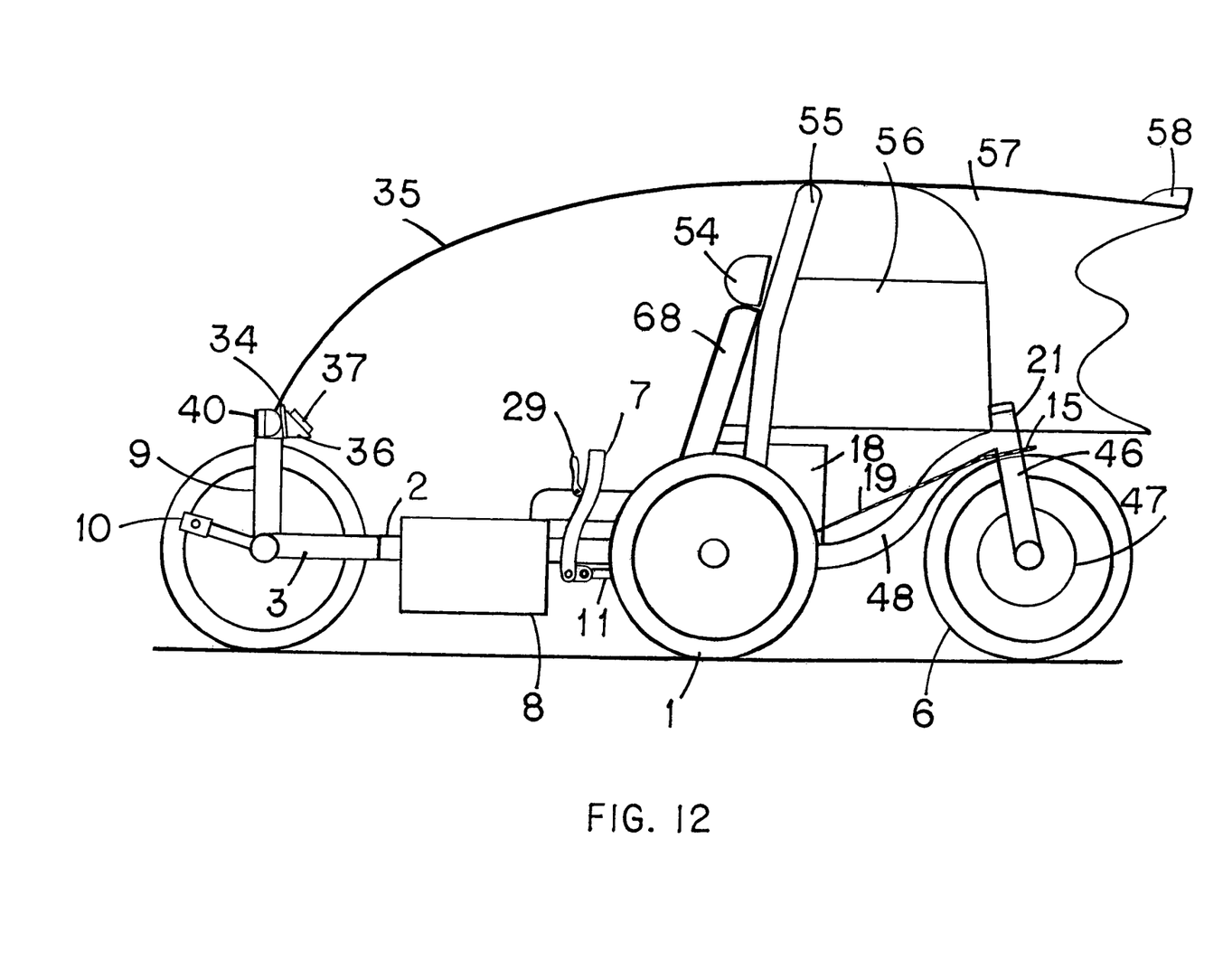
FIG. 12: Left side view of entire vehicle showing position of windshield, dashboard, wheels, chassis frame, battery boxes, cargo area, seat with headrest, windshield support unit also as styling component, tail lights, hub motor and steering mechanism.
Figure 13:
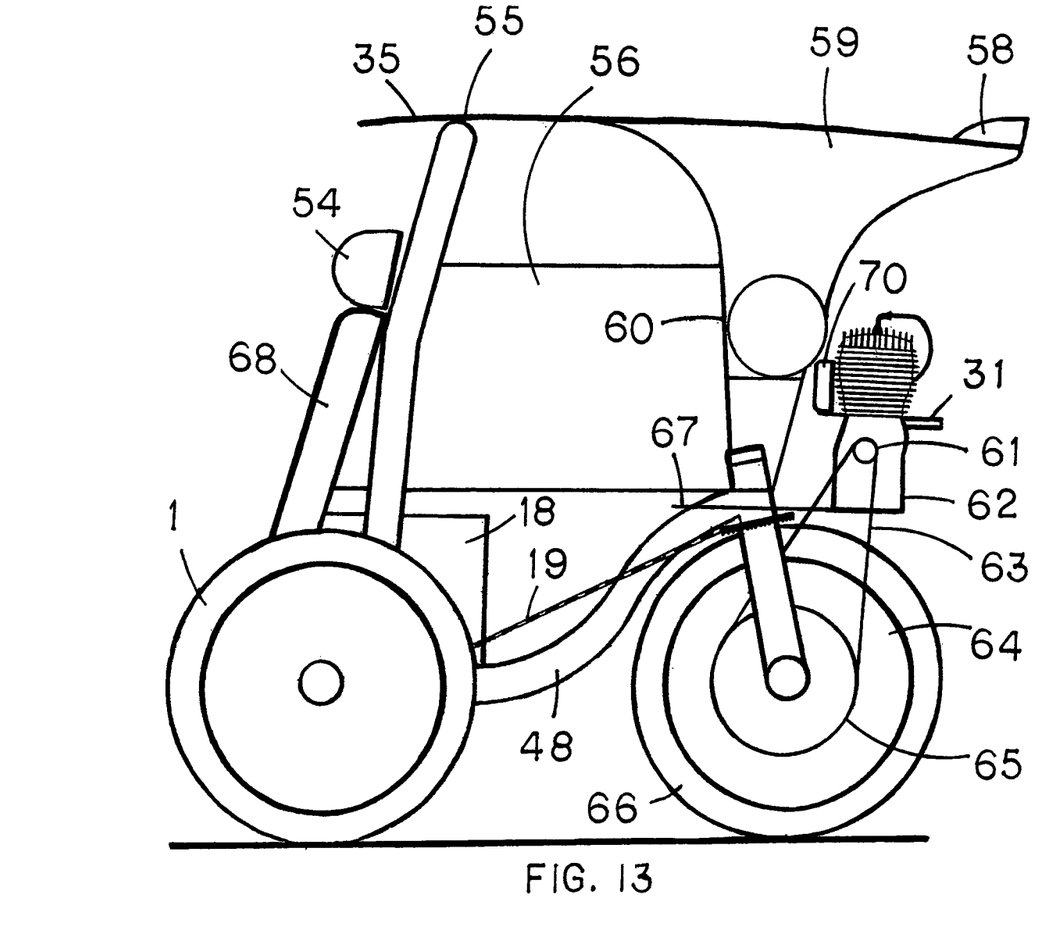
FIG. 13: View of vehicle center and rear section including steered side wheels and steered rear wheel with internal combustion motor powering rear wheel in addition to electric hub motor, which comprises entire rear wheel and is mounted with non-pneumatic tire. This configuration shows vehicle as a gasoline-electric hybrid or as powered solely by an internal combustion engine.
Figure 14:
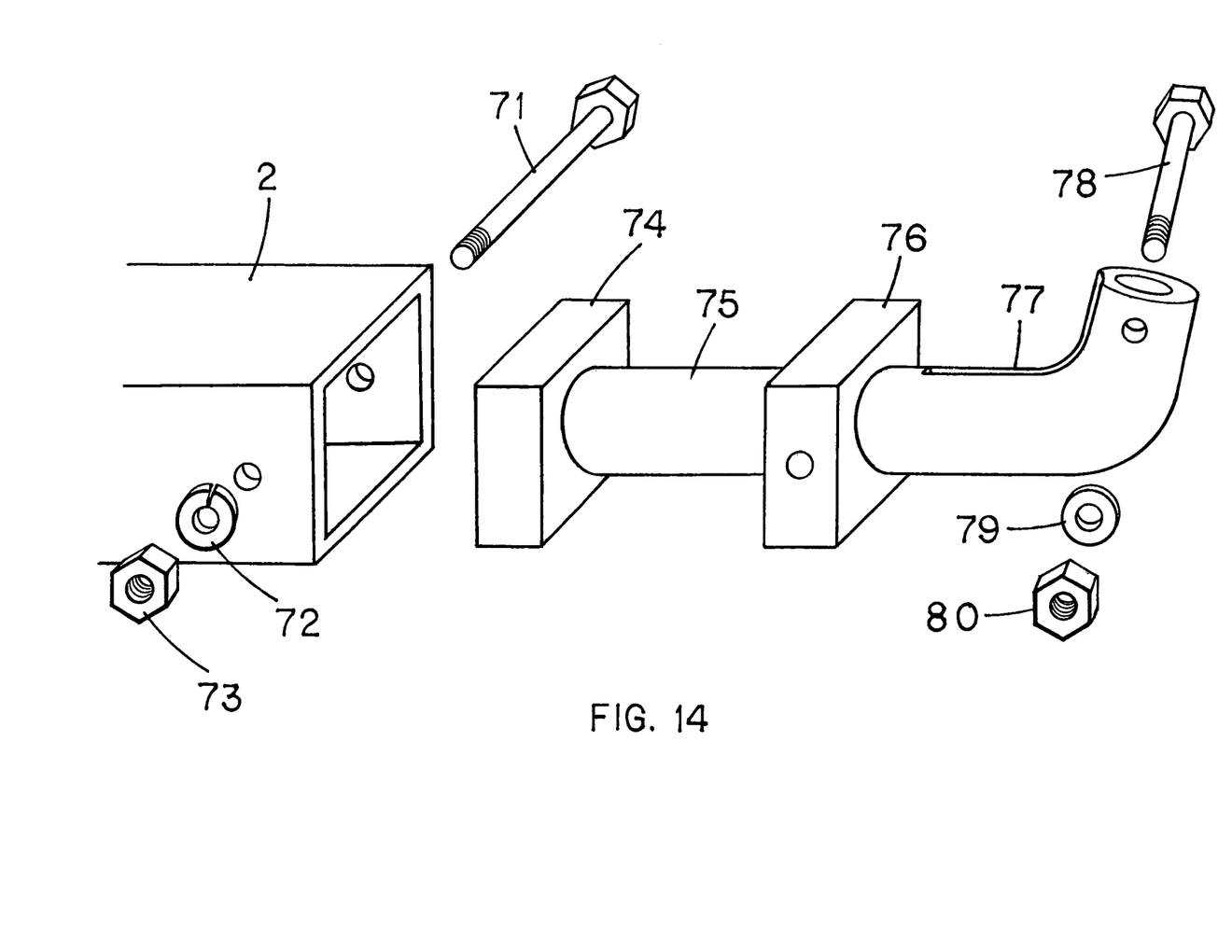
FIG. 14: Detail of chassis frame structure and assembly which comprises rear suspension of fork that carries electric and/or driving wheel.
Figure 15:
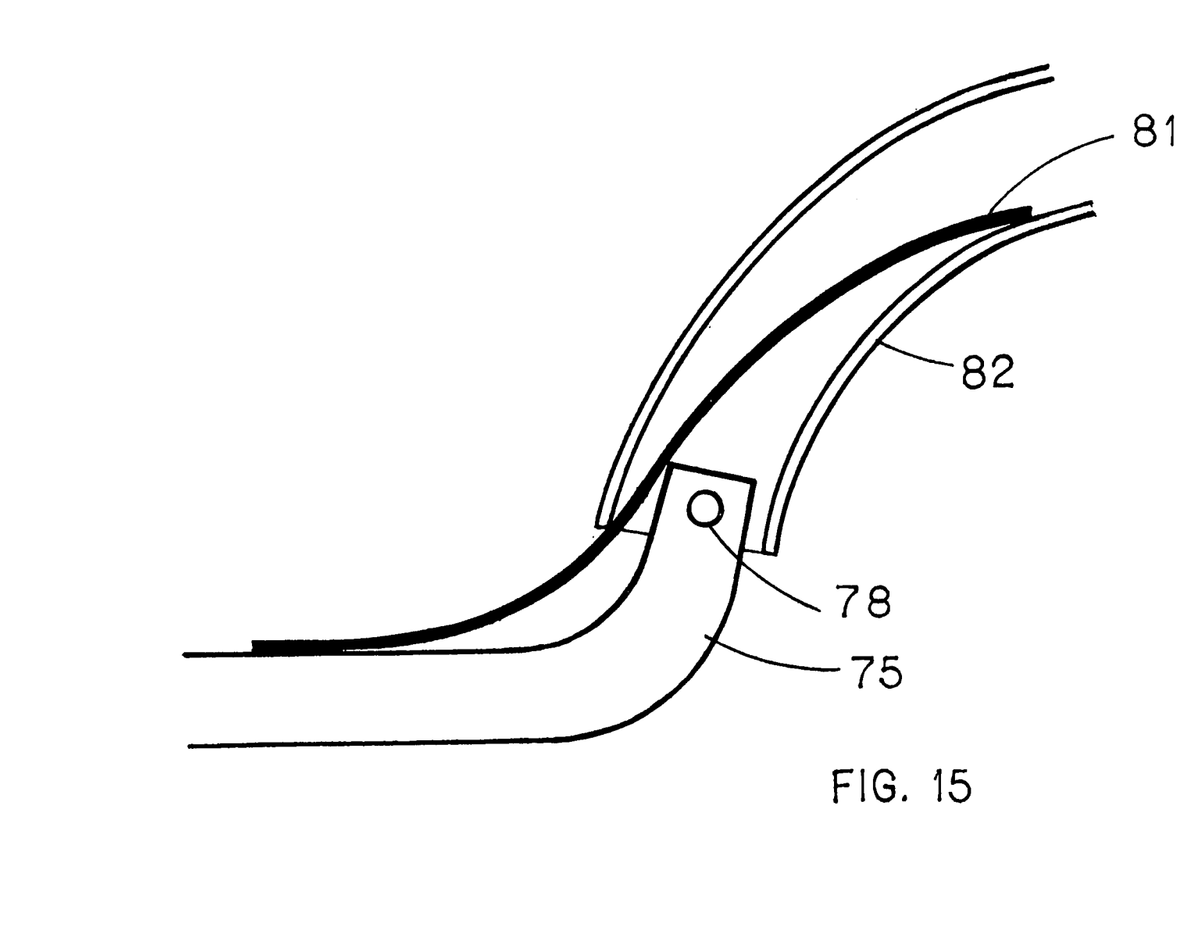
FIG. 15: Detail of rear chassis frame "knuckle" mechanism which allows fork to pivot up and down providing rear wheel suspension for increased traction and better road handling.

Referring to FIGS. 1-15, the four-wheel rhombus vehicle includes a chassis frame 2, front wheel fork 3, rear wheel fork 46, non-steered front wheel 4, steered wheel right 5, steered wheel left 1, cross-beam 23, and rear steered and powered pneumatic wheel 6 (or alternative solid wheel 66). FIG. 1 also shows foot pedal right 16 and foot pedal left 10, which may be eliminated in exchange for an electric motor. In FIG. 2 the front wheel fork and pedal assembly also includes front wheel brace and dashboard bracket 9. The rear steered and powered wheel assembly includes steering swivel assembly 21 and rear wheel frame assembly with long-bending pole spring suspension 48. In addition, the rear steered and powered wheel assembly contains rear wheel hub motor 47, rear steering control disc 15 as well as right steering cable 13 and left steering control cable 19 (FIG. 3). The side wheel steering is accomplished using steering linkage left 11 and steering linkage right 20. All three steered wheels are controlled by the driver with steering lever right 17 and/or steering lever left 7. Steering can be accomplished with either or both levers. Driver sits on seat 68 with optional headrest 54 (FIG. 12). The chassis also holds front battery and tool box 8 and rear battery and tool box 18. The side wheels require right steering swivel assembly 12 and left steering assembly 14 (FIG. 3). Steering also requires steering control arm bearing tube assembly 22 (FIG. 4) and tie rods 69 (FIG. 3). Side wheels spin on side wheel center hub left 32 and side wheel center hub right 53 (FIG. 4 and FIG. 7). Also in FIG. 4, the drive mechanism is further explained by component named rotating electrical connector 24, which allows electrical hub motor cable 25 to proceed to electric hub motor controller 26 that electrically connects to batteries through electric hub motor to battery cable 28 and electric motor cable from switch to battery and controller 49. The steering mechanism further includes left wheel axle 83 and right wheel axle 50 (FIG. 3, FIG. 6 and FIG. 7) attached to steering linkages 11 and 20 (left and right) which are attached to steering cables 13 and 19 (right and left: FIG. 3 and FIG. 4) with left clamp bolt 33 (FIG. 7). The bolt 33 is identical on both sides. Per prototype, the left assembly in FIG. 6 shows tied cable as one method of attachment of cable. Right assembly in FIG. 7. shows through hole method of attachment of cable. Furthermore, the vehicle as shown in FIG. 8 has optional windshield 35 as well as dashboard 36 with vehicle instruments 37. Left headlight 40 and right headlight 39 are mounted on front wheel brace and dashboard bracket 9 as are left mirror 34 and right mirror 38. In FIG. 9 left steering arm lever 7 is shown with electric motor cable from switch to battery 49 and electric motor power variable speed potentiometer 52. For single speed electric motor control the steering lever arms would be mounted with an electric hub motor switch 27 (FIG. 10). Depending on overall powertrain configuration (electric, hybrid or liquid fuel) left control handle 29 and right control handle 30 using brake cable 51 would be alternatives for use as accelerator connected by cable, and depending on driver's left or right hand preference these controls would be interchangeable from one side to the other. The design of the dashboard assembly is shown in FIG. 11 with dashboard base plate 41 mounted on front wheel brace 9 and front block of dashboard 42, mirror base dowel 45 and exterior trim edge 43 and interior trim edge 44. In FIG. 12 the overall side view shows additional components including roll bar and windshield support 55, cargo area 56, windshield support and styling unit 57 (FIG. 12), or alternative windshield support 59 (FIG. 13), as well as tail lights 58. FIG. 13 depicts a hybrid or liquid fuel iteration of vehicle with engine 62 attached to mounting assembly 67. Complete assembly also includes fuel and air intake assembly 70, exhaust system 31 and fuel tank 60. The engine drives the pneumatic rear wheel 6, or solid rear wheel 66, through chain or belt 63 and uses pinion drive sprocket with centrifugal clutch 61. With electric motor the rear wheel is a complete motor unit 64 which can be fitted with sprocket or belt pulley 65. The rear wheel frame assembly with long-bending pole spring suspension is shown in FIG. 14 and FIG. 15 wherein the lower suspension arm 75 is mounted to vehicle chassis 2 by the use of centering block 74 and suspension arm rear block 76 with anchor bolt 71 and fastener nut 73 and lock washer 72. The suspension arm 75 contains a pole spring groove 77 for the long bending pole spring 81 and the suspension arm is attached to upper suspension arm 82 with pin bolt 78 using fastener nut 80 with lock washer 79.

INDUSTRIAL APPLICABILITY

The vehicle can be used for recreational purposes, as a pleasurable method of exercising the human body; with the additional option of having long range of the vehicle by using additional propulsion methods which are embodied. The vehicle can also be used for light delivery work in narrow paths and streets with the advantage of a low center of gravity and optimal turning radius. With the use of pedals on the front wheel the range of the vehicle is not limited to fuel supply for any additional propulsion methods. For military or security force applicability, the vehicle, due to its very low profile, narrow shape, compatibility with body enclosures and nearly silent operation, using electric motor(s); it can be used for reconnaissance and communication work.

I claim:

1. A vehicle, comprising:
   a. a frame having a front wheel fork extending from a front of the frame;
   b. a rear wheel frame assembly comprising:
      i. a swivel assembly in communication with a rear of the frame; and
      ii. a rear wheel fork rotatably coupled to the swivel assembly;
   c. a cross-beam coupled to the frame, wherein the frame and the cross-beam are generally perpendicular to one another, and wherein a right end of the cross-beam is a right steering assembly, and a left end of the cross-beam is a left steering assembly;
   d. a steering mechanism comprising:
      i. a right wheel axle rotatably coupled to the right steering assembly;

ii. a left wheel axle rotatably coupled to the left steering assembly;
iii. a right steering lever;
iv. a left steering lever;
v. a steering control arm bearing tube assembly coupled to the frame, wherein the steering control arm bearing tube assembly connects the right steering lever to the left steering lever;
vi. a tie rod that pivotably connects the right wheel axle to the left wheel axle;
vii. a right steering linkage that connects the right steering lever to the right wheel axle;
viii. a left steering linkage that connects the left steering lever to the left wheel axle;
ix. a rear steering control disc in communication with the rear wheel fork;
x. a right steering control cable having a first end and a second end, wherein the first end of the right steering control cable is coupled to the right wheel axle, and the second end of the right steering control cable is coupled to the rear steering control disc; and
xi. a left steering control cable having a first end and a second end, wherein the first end of the left steering control cable is coupled to the left wheel axle, and the second end of the left steering control cable is coupled to the rear steering control disc;
e. a non-steered front wheel coupled to the front wheel fork;
f. a right wheel coupled to the right wheel axle;
g. a left wheel coupled to the left wheel axle; and
h. a rear wheel coupled to the rear wheel fork,
wherein the steering mechanism is configured to steer the right wheel, the left wheel, and the rear wheel in unison, and wherein the front wheel, the right wheel, the left wheel, and the rear wheel define a rhombus and are configured to engage a planar surface simultaneously.

2. The vehicle of claim 1, further comprising a pair of foot pedals coupled to the front wheel, wherein the foot pedals are configured to turn the front wheel.

3. The vehicle of claim 1, wherein the right wheel, the left wheel, and the rear wheel define an isosceles triangle.

4. The vehicle of claim 1, further comprising a braking system comprising:
a. a right control handle coupled to the right steering lever; and
b. a left control handle coupled to the left steering lever,
wherein the right control handle and the left control handle are used to control the braking system.

5. The vehicle of claim 1, further comprising:
a. one or more headlights;
b. one or more taillights; and
c. a horn.

6. The vehicle of claim 1, further comprising;
a. one or more fenders;
b. a windshield;
c. a dashboard; and
d. a cargo container.

7. The vehicle in claim 1, further comprising;
a. a head rest;
b. a left mirror; and
c. a right mirror.

8. The vehicle of claim 1, further comprising an electric motor in communication with the front wheel, wherein the electric motor is configured to power the front wheel.

9. The vehicle of claim 1, wherein the rear wheel is powered by a power source selected from the group consisting of an electric motor, a hybrid motor, and a liquid fuel motor.

10. The vehicle of claim 1, further comprising a seat coupled to the frame.

11. The vehicle of claim 1, wherein the right wheel and the left wheel are parallel.

12. A vehicle, comprising:
a. a frame having a front wheel fork extending from a front of the frame;
b. a rear wheel frame assembly comprising:
i. a swivel assembly in communication with a rear of the frame; and
ii. a rear wheel fork rotatably coupled to the swivel assembly;
c. a cross-beam coupled to the frame, wherein the frame and the cross-beam are generally perpendicular to one another;
d. a steering mechanism in communication with the frame and the cross-beam, the steering mechanism comprising:
i. a right wheel axle rotatably coupled to a right section of the cross-beam;
ii. a left wheel axle rotatably coupled to a left section of the cross-beam;
iii. a tie rod that pivotably connects the right wheel axle to the left wheel axle, the tie rod being configured to force the right wheel axle and the left wheel axle to swivel in unison;
iv. a right steering lever in communication with the right wheel axle; and
v. a left steering lever in communication with the left wheel axle, wherein movement of either the right steering lever or the left steering lever is configured to steer the right wheel and the left wheel,
e. a non-steered front wheel coupled to the front wheel fork;
f. a right wheel coupled to the right wheel axle;
g. a left wheel coupled to the left wheel axle; and
h. a rear wheel coupled to the rear wheel fork,
wherein the front wheel, the right wheel, the left wheel, and the rear wheel define a rhombus and are configured to engage a planar surface in unison.

13. The vehicle of claim 12, further comprising a rear wheel steering assembly, comprising:
a. a rear steering control disc in communication with the rear wheel fork;
b. a right steering control cable having a first end and a second end, wherein the first end of the right steering control cable is coupled to a right wheel axle, and the second end of the right steering control cable is coupled to the rear steering control disc; and
c. a left steering control cable having a first end and a second end, wherein the first end of the left steering control cable is coupled to a left wheel axle, and the second end of the left steering control cable is coupled to the rear steering control disc,
wherein the rear wheel steering assembly is configured to steer the rear wheel in unison with the right wheel and the left wheel.

* * * * *